(12) United States Patent
Hasemann et al.

(10) Patent No.: US 9,206,691 B2
(45) Date of Patent: Dec. 8, 2015

(54) LAVAL NOZZLE

(75) Inventors: Heinrich Hasemann, Wunstorf (DE); Manfred Schmitt, Heppenheim (DE); Ilona Krinn, Moehringen (DE); Bernd Banzhaf, Stuttgart (DE); Juergen Stegmaier, Ludwigsburg (DE); Patrick Glaser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 751 days.

(21) Appl. No.: 13/518,052

(22) PCT Filed: Oct. 25, 2010

(86) PCT No.: PCT/EP2010/066080
§ 371 (c)(1),
(2), (4) Date: Oct. 29, 2012

(87) PCT Pub. No.: WO2011/085835
PCT Pub. Date: Jul. 21, 2011

(65) Prior Publication Data
US 2013/0058772 A1 Mar. 7, 2013

(30) Foreign Application Priority Data
Dec. 22, 2009 (DE) .......................... 10 2009 055 180

(51) Int. Cl.
*F01D 17/14* (2006.01)
*F01D 1/04* (2006.01)
*F01D 9/02* (2006.01)
*F02C 7/042* (2006.01)

(52) U.S. Cl.
CPC .. *F01D 1/04* (2013.01); *F01D 9/02* (2013.01); *F01D 17/148* (2013.01); *F02C 7/042* (2013.01); *F05D 2240/128* (2013.01)

(58) Field of Classification Search
CPC ........... F01D 1/04; F01D 9/02; F01D 17/148; F02C 7/042; F05D 2240/128
USPC .......................................................... 415/202
See application file for complete search history.

(56) References Cited

U.S. PATENT DOCUMENTS 2,737,019 A * 3/1956 Billman .......................... 60/794
2,942,845 A * 6/1960 Loader ........................... 415/151

(Continued)

FOREIGN PATENT DOCUMENTS

| CH | 348576 | 8/1960 |
|----|--------|--------|
| DE | 3413304 | 10/1985 |
| GB | 191421322 | 12/1914 |

OTHER PUBLICATIONS

PCT/EP2010/066080 International Search Report dated Aug. 24, 2011 (Translation and Original, 6 pages).

*Primary Examiner* — Dwayne J White
*Assistant Examiner* — Eldon Brockman
(74) *Attorney, Agent, or Firm* — Michael Best & Friedrich LLP

(57) ABSTRACT

In a Laval nozzle (10) having a flow channel (12), which has a flow cross-section (14) extending in a convergent-divergent manner, according to the invention the flow channel (12) comprises mutually opposing first flow channel walls (16, 16'), which are formed by two nozzle bodies (18, 18') spaced a fixed distance apart from one another. Two mutually opposite second flow channel walls (20, 20'), which can be moved relative toward one another or away from one another for adjusting the flow cross-section (14) of the flow channel (12), are disposed between the nozzle bodies (18, 18').

13 Claims, 4 Drawing Sheets

(56) References Cited

U.S. PATENT DOCUMENTS

| | | | |
|---|---|---|---|
| 3,612,403 A * | 10/1971 | Baghdadi | 239/265.37 |
| 3,804,335 A | 4/1974 | Sohre | |
| 4,344,404 A * | 8/1982 | Child et al. | 123/538 |
| 2007/0025841 A1 * | 2/2007 | Milazar | 415/134 |
| 2008/0061559 A1 * | 3/2008 | Hirshberg | 290/55 |

* cited by examiner

LAVAL NOZZLE

BACKGROUND OF THE INVENTION

The invention relates to a Laval nozzle having a flow channel, which has a flow cross-sectional profile extending in a convergent-divergent manner.

Laval nozzles of this kind are, for example, used for the purpose of transferring the enthalpy of a working fluid flowing through the Laval nozzle into kinetic energy, i.e. to accelerate the flowing working fluid to as high a speed as possible. The working fluid delivered to the Laval nozzle with subsonic speed is thereby initially accelerated by means of the convergent flow cross-section in the nozzle inlet of the Laval nozzle and thereby achieves the specific sonic speed thereof in the region of the critical, i.e. the smallest, flow cross-section of the flow channel in order to be accelerated further to supersonic speed in the region of a nozzle outlet disposed downstream, which has a divergent flow cross-section. The kinetic energy of the working fluid accelerated in such a way can subsequently, for example, be guided onto turbine blades of an axial turbine and be converted by said turbine into rotational energy.

The Laval nozzles available on the market have however a critical flow cross-section or respectively flow cross-sectional profile of the flow channel, which is constructively designed for a certain mass flow of the delivered working fluid. In the case of a fixed, very narrow flow cross-section, a mass flow can be precisely achieved in the Laval nozzle at a constant pressure upstream of said Laval nozzle. A change in the mass flow therefore accompanies a drop in pressure or an increase in pressure upstream of said Laval nozzle. This is not desirable.

It is therefore the aim of the invention to develop a generic Laval nozzle in such a way that said nozzle can also be efficiently operated at different mass flows of a working fluid.

It is further the aim of the invention to specify a Laval nozzle arrangement as well as an axial turbine comprising a Laval nozzle or such a Laval nozzle arrangement, which can be efficiently operated at different mass flows of a working fluid.

SUMMARY OF THE INVENTION

According to the invention, the flow channel of the Laval nozzle comprises mutually opposing first flow channel walls, which are formed by two nozzle bodies spaced a fixed distance apart from one another, wherein two mutually opposite second flow channel walls, which can be moved relative toward one another or away from one another for adjusting the flow cross-section of the flow channel, are disposed between the nozzle bodies. In so doing, the flow cross-section of the Laval nozzle, in particular in the region of the narrowest flow cross section, can be adjusted to different mass flows of a working fluid as these occur during waste heat utilization of an internal combustion engine in the motor vehicle field. The working fluid guided through the Laval nozzle can thereby further achieve the specific sonic speed thereof (1 Mach) and therefore be accelerated to supersonic speed downstream of the critical (smallest) flow cross-section of the Laval nozzle without the pressure of the working fluid upstream of the Laval nozzle changing. In total, the useable kinetic energy for different mass flows of the working fluid is thereby optimized.

According to a developed embodiment of the invention, the two nozzle bodies are cylindrically designed, preferably having an annular or sleeve shape, (cylinder body), and are disposed coaxially and one inside the other. Firstly, a simpler a more robust construction of the Laval nozzle is thereby achieved. Secondly, the geometry of the working fluid flow leaving the nozzle can be adjusted in a simple manner to the geometry of an impeller of a turbine or the turbine blades thereof.

A particularly simple adjustability of the Laval nozzle results according to one exemplary embodiment, in which in each case one of the two second flow channel walls is disposed at one of the two nozzle bodies, wherein the nozzle bodies can be adjusted relative to one another by means of the flow channel walls. In an advantageous manner of production technology, the second flow channel walls can thereby be integrally formed on the respective nozzle bodies, i.e. designed as one piece with said nozzle bodies.

In order that the working fluid flow can pass the flow channel as loss free as possible, the second flow channel walls advantageously fit closely in a flow-proof manner on the surface of the one nozzle body. The mutual support of the nozzle bodies achieved thereby via the flow channel walls is additionally advantageous for the stability of the Laval nozzle or respectively for a precise adjustment function of the Laval nozzle.

The risk of gap losses, which also can especially result from manufacturing tolerances or different temperature drifts of the components, is further reduced according to one embodiment of the invention by the fact that the second flow channel walls of the surface of the one nozzle body are subjected to a, preferably elastic, pre-tensioning force. In the case of cylindrically designed nozzle bodies, this can, for example, be achieved by means of a corresponding dimensioning of the second flow channel walls in relation to the inside or outside diameter of the nozzle bodies. The Laval nozzle can also have in this regard a spring body, by means of which at least one cylindrical nozzle body is impinged with a force acting in the radial direction.

In order to achieve a more optimized sealing in the region of the mutual contact surfaces of the nozzle bodies and the second flow channel walls as well as a further reduced frictional resistance, at least one, preferably linear, sealing element can be interposed between the second flow channel walls and the nozzle bodies, said sealing element having a small frictional resistance. Said sealing element can, for example, be manufactured from a plastic material, such as PTFE, or from a ceramic material and/or be designed as a coating.

In order to achieve an adjustment of the flow cross-section of the flow channel, which is as simple as possible, has low wear and at the same time minimum delay time, the surfaces of the two nozzle bodies and/or the second flow channel walls, which face one another, preferably have a small frictional resistance on the contact surfaces thereof. This can, for example, be achieved by means of a surface treatment, such as nitriding, and/or a suitable coating.

By adjusting the flow cross-section of the Laval nozzle, the critical (smallest) flow cross-section of the Laval nozzle shall be changed. At the same time, the ratio of the surface through which a fluid can flow in the region of said critical flow cross-section with respect to the surface through which a fluid can flow in the region of a maximum outlet cross-section of the nozzle (diffuser) shall however remain unchanged in order to ensure that the discharge Mach number out of the nozzle and hence the design pressure ratio through the turbine do not change as a result of adjusting the flow cross-section of the Laval nozzle. In order to fulfill this requirement, the diverging flow cross-section of the flow channel downstream of the critical flow cross-section, i.e. in the region of the nozzle outlet, is preferably not implemented via the contouring of the second flow channel walls but via the first flow channel walls formed from the mutually facing surfaces of the nozzle bodies. Said first flow channel walls therefore comprise a fixed Laval contour along the flow channel. The second flow channel walls thereby converge against each other preferably along the flow channel up until the narrowest flow cross-section thereof and run parallel to each other downstream of the narrowest flow cross-section.

The advantage associated with the nozzle arrangement according to the invention is apart from the previously mentioned advantages of the Laval nozzle according to the invention essentially that the flow cross-sections of the Laval nozzle can be synchronously actuated or adjusted as a function of a variable mass flow of a working fluid.

The advantage associated with the axial turbine according to the invention results substantially from the fact that said turbine can be efficiently operated as a function of an available mass flow of the working fluid.

Further advantages and advantageous embodiments of the subject matter of the invention can be extracted from the description, the drawings and the claims.

BRIEF DESCRIPTION OF THE DRAWINGS

The invention is explained below in detail using an exemplary embodiment which is depicted in a sharply schematized manner in the drawings.

In the drawings.

DETAILED DESCRIPTION

Figure 1:
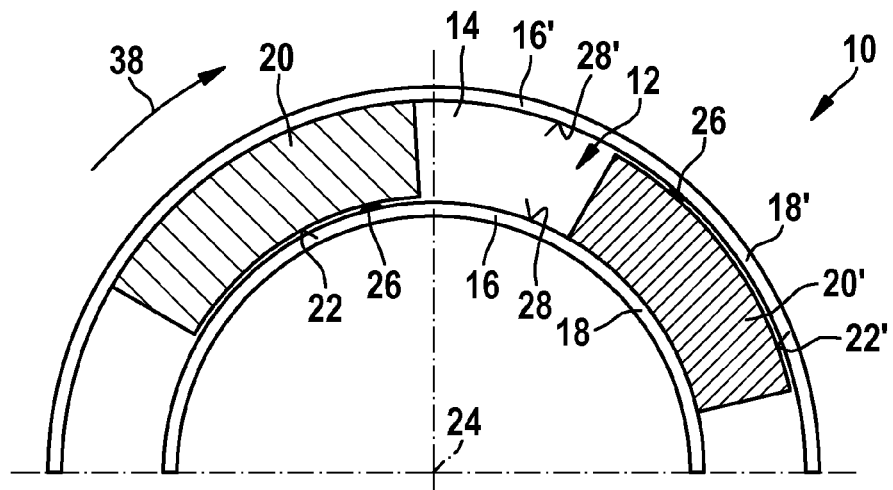
FIG. 1 shows a schematized cross-section of a Laval nozzle according to the invention.

In FIG. 1, a Laval nozzle denoted entirely with the reference numeral 10 is depicted in a sharply schematized manner, which comprises a flow channel 12 having a substantially rectangular flow cross-section 14, which has an overall convergent-divergent profile along the flow channel 12.

The flow channel 12 has mutually opposing first flow channel walls 16, 16', which are formed by two nozzle bodies 18, 18' spaced a fixed distance apart from one another, said nozzle bodies being disposed coaxially and one inside the other.

The flow channel 12 is delimited in the circumferential direction of the nozzle bodies 18, 18' by two mutually opposite second flow channel walls 20, 20', which in each case are disposed between the two nozzle bodies 18, 18'.

The second flow channel walls 20, 20' are in each case formed from one of the two nozzle bodies 18, 18' and dimensioned in such a way that said flow channel walls fit closely to the respective other nozzle body 18, 18' with the sliding surface 22, 22' thereof, which faces said respective other nozzle body 18; 18', in a positively locking and flow-proof manner while being elastically pre-tensioned.

The outer cylindrical nozzle body 18' depicted in FIG. 1 can be rotated by means of an adjusting mechanism, which is not depicted in the drawing, with respect to the smaller nozzle body 18 depicted in the figure about the common axis 24 thereof. In so doing, the second flow channel wall 20 depicted on the left side of FIG. 1 can be moved towards the other second flow channel wall 20' or away from the same.

The nozzle bodies 18, 18' and the sliding surfaces 22, 22' of the second flow channel walls 20, 20' have a small frictional resistance, wherein a linear elastic sealing element made from PTFE is additionally disposed between the two nozzle bodies 18, 18' and the second flow channel walls 20, 20'. The sealing element 26 has likewise in turn a small frictional resistance and is directed towards thermal loads that occur during the operation of the Laval nozzle 10. Said sealing element 26 can alternatively be manufactured from a ceramic, a metallic or a composite material or respectively be embodied as a suitable coating of the nozzle bodies 18, 18' and/or of the sliding surfaces 22, 22' of the second flow channel walls 20, 20'.

Figure 2:
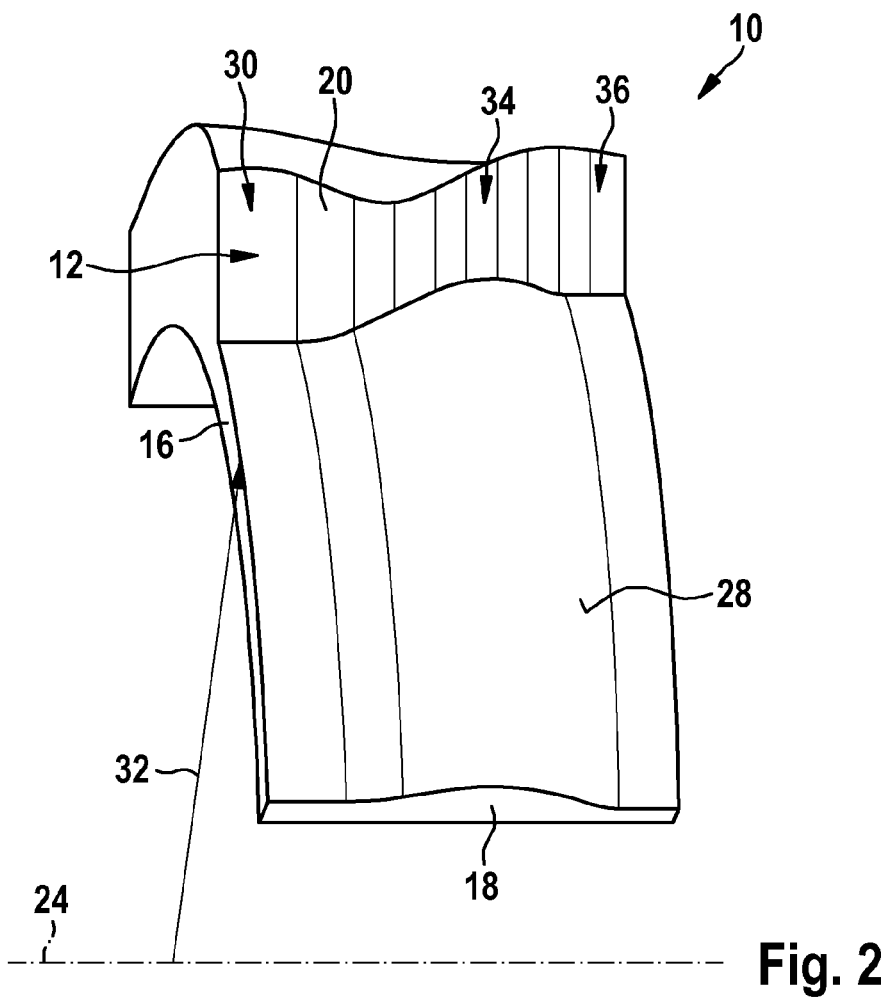
FIG. 2 shows a perspective view of the Laval nozzle depicted in FIG. 1 with the outer nozzle body having been removed.

The surfaces 28, 28' facing each other (lateral surfaces) of the two cylindrical nozzle bodies 18, 18' have a fixed Laval contour along the flow channel 12, as is clarified, for example, using the perspective depiction of the smaller cylindrical nozzle body 18 depicted in FIG. 2. In the region of a nozzle inlet 30 of the Laval nozzle 10, the cylindrical nozzle body 18 initially has an outer radius 32 increasing ramp-wise along the flow channel 12, said radius achieving a maximum in the region of a critical flow cross-section 34 of the Laval nozzle 10 and tapering again downstream of the critical flow cross-section 34 in the region of a nozzle outlet 36 (diffuser).

Figure 3:
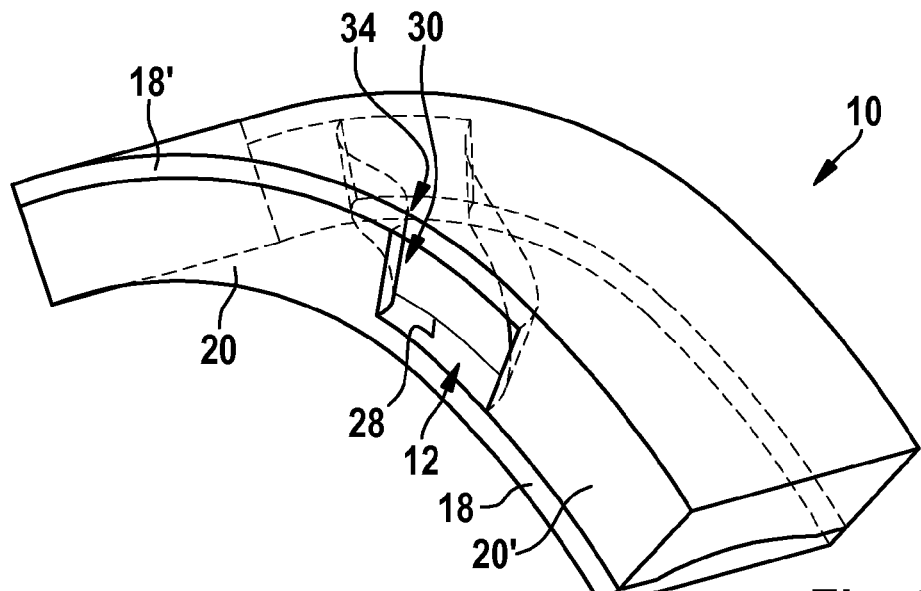
FIG. 3 a further perspective view of the Laval nozzle depicted in FIG. 1.

As can be seen particularly in FIG. 3, the two second flow channel walls 20. 20' converge against each other starting from the region of the nozzle inlet 30 up until the critical flow cross-section 34 of the flow channel 12. Said flow channel walls 20, 20' run however parallel to one another downstream of the critical flow cross-section 34.

As is shown in FIG. 1, the second flow channel wall 20 is moved in the circumferential direction of the nozzle bodies 18, 18' toward the other second flow channel wall 20' by rotating the nozzle body 18' with respect to the nozzle body 18 in the direction of the arrow denoted with the reference numeral 38 in the figure. In so doing, the flow cross-section 14 along the flow channel 12 is reduced. Because the second flow channel walls 20, 20' are disposed substantially parallel to one another in the region of the nozzle outlet 36, the ratio of the minimum (critical) flow cross-section 34 to a maximum flow cross-section of the nozzle outlet 36 remains constant for each rotational setting of the Laval nozzle or respectively of the flow cross-section 14 of the flow channel 10. As explained earlier, the increase in the flow cross-section surface required for the acceleration of a working fluid in the region of the nozzle outlet 36 is only contingent on the surface contouring of the first flow channel walls or of the mutually facing surfaces 28, 28' of the two nozzle bodies 18, 18'.

Figure 4:
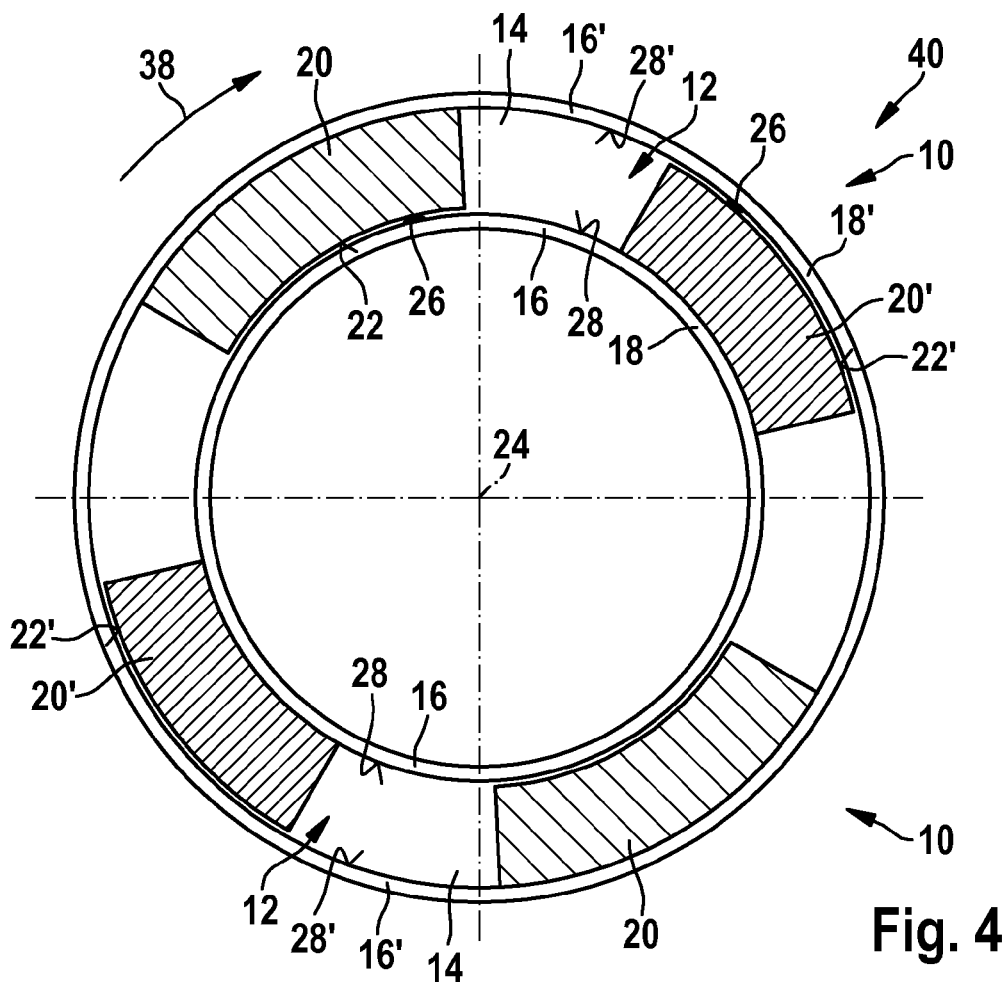
FIG. 4 an end face view of a nozzle arrangement comprising two Laval nozzles.

In FIG. 4, an inventive Laval nozzle arrangement 40 comprising in total two Laval nozzles 10 is shown, which are substantially configured in the manner previously described. The flow channels 12 of the Laval nozzles 10 have in each case two mutually opposing first flow channel walls 16, 16', which in each case are formed from the same cylindrical nozzle bodies 18, 18' which are disposed coaxially and one inside the other. The outer cylindrical nozzle body 18' can be adjusted about the common axis 24 of the nozzle bodies 18, 18', and therefore second flow channel walls 20 formed from the nozzle body 18' can be moved in the direction toward or away from second flow channel walls 20' formed by the nozzle body 18'. The flow channels 12 or the flow cross-sections 14 of the two Laval nozzles 10 of the Laval nozzle arrangement 40 can thereby be synchronously actuated or adjusted.

Figure 5:
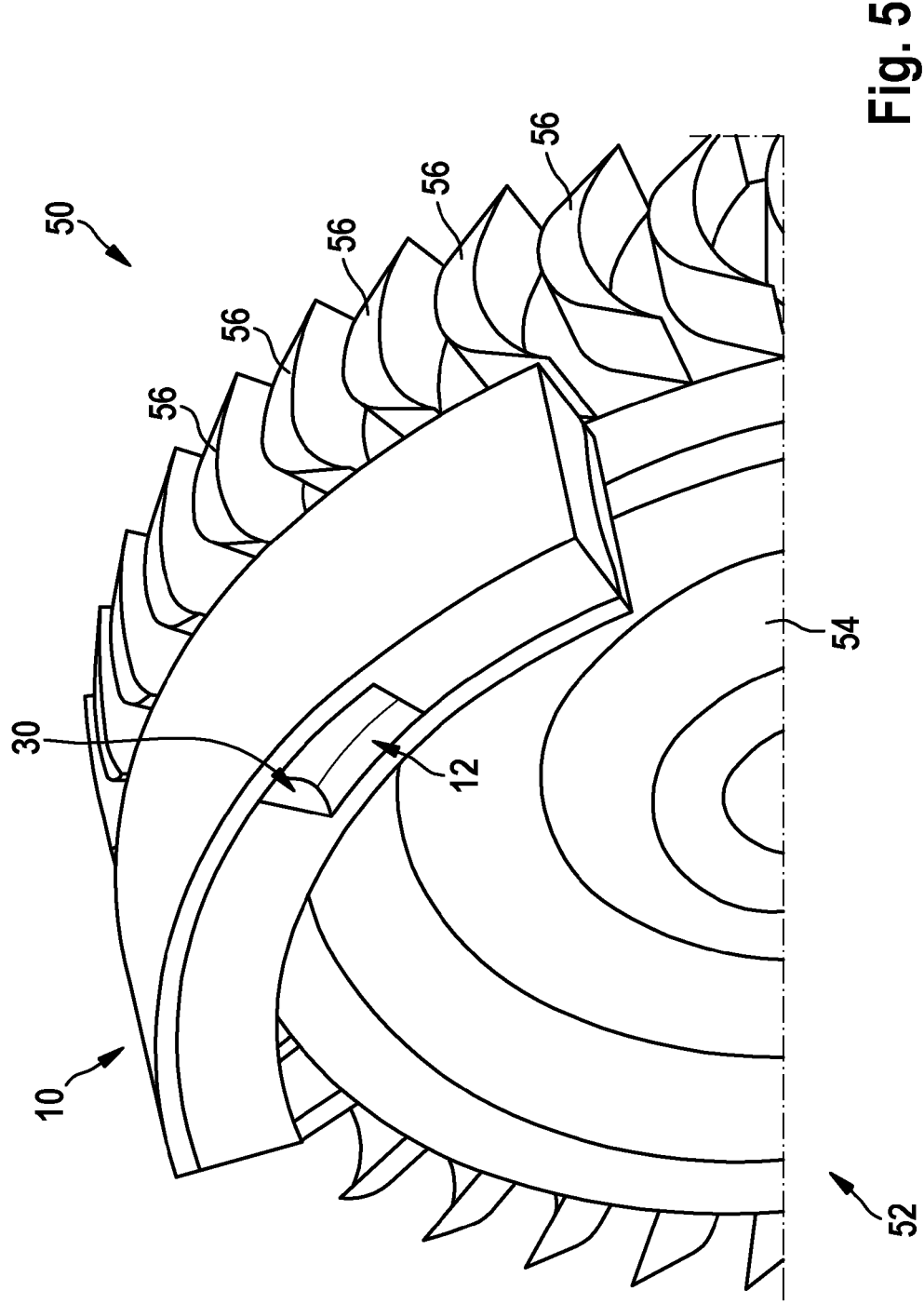
FIG. 5 a perspective view of a partially depicted axial turbine comprising a Laval nozzle.
Figure 6:
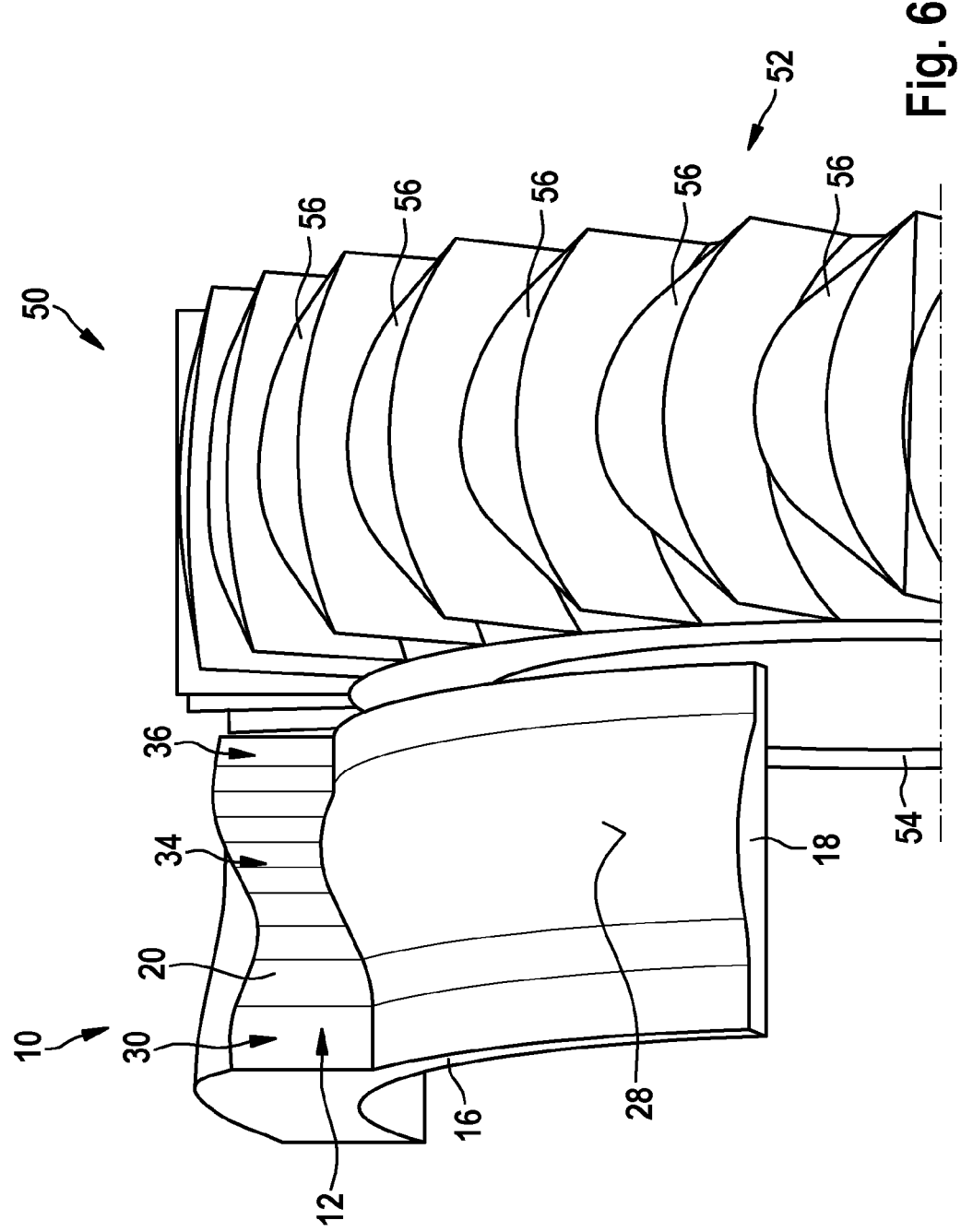
FIG. 6 an axial turbine similar to that in FIG. 5 and comprising a Laval nozzle, in which the outer nozzle body is removed.

In FIGS. 5 and 6, an axial turbine 50 designed for a balanced pressure operation is shown, which axial turbine comprises a Laval nozzle, which corresponds in the design thereof substantially to the Laval nozzle described in FIGS. 1 to 3.

The axial turbine 50 serves to convert kinetic energy of a fluidic working medium, which, for example, has been heated up by the exhaust gas stream of an internal combustion engine and accelerated by the Laval nozzle 10, into rotational energy and comprises in a conventional manner a movable rotor 52 having a disc 54 and a plurality of turbine blades 56 disposed circumferentially on the disc 54.

The flow channel 12 of the Laval nozzle runs in sections transversely to the longitudinal axis thereof, whereby the working fluid during discharge from the Laval nozzle 10 can be guided in an optimal angle of inflow onto the turbine blades 56 of the axial turbine. The Laval nozzle immediately adjoins the axial turbine and is steplessly disposed upstream of the same in order to minimize gap losses as well as turbulences in the working fluid.

The axial turbine 50 can also have a nozzle arrangement, as was previously described, according to one alternative exemplary embodiment not depicted in the drawing.

What is claimed is:

1. A Laval nozzle (10) having a flow channel (12), which has a flow cross-sectional profile (14) extending in a convergent-divergent manner, the flow channel (12) comprising two mutually opposing first flow channel walls (16, 16'), which are formed by two nozzle bodies (18, 18') spaced a fixed distance apart from one another, and also comprising two mutually opposite second flow channel walls (20, 20'), which are movable relative toward one another or away from one another for adjusting the flow cross-sectional profile (14) of the flow channel (12), wherein the second flow channel walls (20, 20') are disposed between the nozzle bodies (18, 18'), wherein the nozzle bodies (18, 18') are cylindrical and are disposed coaxially and one inside the other, and wherein mutually facing surfaces (28, 28') of the nozzle bodies (18, 18') have a fixed Laval contour along the flow channel (12).

2. The Laval nozzle according to claim 1, characterized in that in each case one of the two second flow channel walls (20, 20') is disposed at one of the two nozzle bodies (18, 18'), wherein the nozzle bodies (18, 18') are adjustable relative to one another by means of the second flow channel walls (20, 20').

3. The Laval nozzle according to claim 1, characterized in that the second flow channel walls (20, 20') fit closely in a flow-proof manner to a respective other nozzle body (18, 18').

4. The Laval nozzle according to claim 1, characterized in that at least one of the two nozzle bodies (18, 18') and the second flow channel walls (20, 20') have a frictional resistance on the mutual contact surfaces thereof that facilitates an adjustment of the flow cross-sectional profile (14).

5. The Laval nozzle according to claim 1, characterized in that in each case at least one sealing element (26), which has a frictional resistance that facilitates an adjustment of the flow cross-sectional profile (14), is interposed between the two nozzle bodies (18, 18') and the second flow channel walls (20, 20').

6. The Laval nozzle according to claim 1, characterized in that the second flow channel walls (20, 20') run parallel to one another downstream of a critical flow cross-section (34).

7. A nozzle arrangement (40) comprising at least two Laval nozzles (10) according to claim 1, wherein the flow channels (12) of the Laval nozzles (10) have in each case two mutually opposing first flow channel walls (16, 16'), which in each case are formed from the same cylindrical nozzle bodies (18, 18') that are disposed coaxially and one inside the other.

8. An axial turbine (50) comprising the Laval nozzle (10) according to claim 1.

9. The Laval nozzle according to claim 1, characterized in that in each case one of the two second flow channel walls (20, 20') is disposed at one of the two nozzle bodies (18, 18'), integrally formed therewith, wherein the nozzle bodies (18, 18') are adjustable relative to one another by means of the second flow channel walls (20, 20').

10. The Laval nozzle according to claim 1, characterized in that the second flow channel walls (20, 20') fit closely in a flow-proof manner to a respective other nozzle body (18, 18') while being subjected to a pre-tensioning force.

11. The Laval nozzle according to claim 1, characterized in that in each case at least one linear sealing element (26), which has a frictional resistance that facilitates an adjustment of the flow cross-sectional profile (14), is interposed between the two nozzle bodies (18, 18') and the second flow channel walls (20, 20').

12. The Laval nozzle according to claim 1, characterized in that the second flow channel walls (20, 20') run parallel to one another downstream of a narrowest flow cross-section (34).

13. An axial turbine (50) comprising a nozzle arrangement (40) according to claim 7.

* * * * *